(12) United States Patent
Brudniok

(10) Patent No.: US 8,496,299 B2
(45) Date of Patent: Jul. 30, 2013

(54) OMNIDIRECTIONAL WHEEL AND METHOD FOR THE ASSEMBLY THEREOF

(75) Inventor: Sven Brudniok, Augsburg (DE)

(73) Assignee: Kuka Roboter GmbH, Augsburg (DE)

( * ) Notice: Subject to any disclaimer, the term of this patent is extended or adjusted under 35 U.S.C. 154(b) by 377 days.

(21) Appl. No.: 12/810,027

(22) PCT Filed: Apr. 20, 2009

(86) PCT No.: PCT/EP2009/002861
§ 371 (c)(1),
(2), (4) Date: Jun. 22, 2010

(87) PCT Pub. No.: WO2009/129978
PCT Pub. Date: Oct. 29, 2009

(65) Prior Publication Data
US 2010/0270850 A1    Oct. 28, 2010

(30) Foreign Application Priority Data
Apr. 21, 2008 (DE) .......................... 10 2008 019 976

(51) Int. Cl.
*B60B 19/00* (2006.01)
(52) U.S. Cl.
USPC ................................. 301/5.23; 16/45; 180/20
(58) Field of Classification Search
USPC ........ 301/5.1, 5.23; 16/18 R, 45–47; 180/7.1, 180/7.2, 20
See application file for complete search history.

(56) References Cited

U.S. PATENT DOCUMENTS

| 3,789,947 | A | * | 2/1974 | Blumrich | 301/5.23 |
| 3,876,255 | A | | 4/1975 | Ilon | |
| 5,551,349 | A | * | 9/1996 | Bodzin | 301/5.23 |
| 6,340,065 | B1 | * | 1/2002 | Harris | 180/7.2 |
| 6,796,618 | B2 | * | 9/2004 | Harris | 301/5.1 |
| 7,293,790 | B2 | | 11/2007 | Byun et al. | |
| 7,318,628 | B2 | * | 1/2008 | Guile | 301/5.23 |
| 7,566,102 | B2 | * | 7/2009 | Guile | 301/5.23 |
| 7,641,288 | B1 | * | 1/2010 | Baker et al. | 301/5.23 |
| 2003/0067209 | A1 | * | 4/2003 | Marrero | 301/5.23 |
| 2005/0153629 | A1 | | 7/2005 | Byun et al. | |
| 2005/0183896 | A1 | * | 8/2005 | Fenelli et al. | 180/7.1 |
| 2009/0065113 | A1 | | 3/2009 | Gunther | |

FOREIGN PATENT DOCUMENTS

| GB | 2 242 173 | A | 9/1991 |
| KR | 2002063737 | A | 8/2002 |

* cited by examiner

*Primary Examiner* — Jason Bellinger
(74) *Attorney, Agent, or Firm* — Schiff Hardin LLP

(57) ABSTRACT

An omnidirectional wheel has a hub that is rotatable around a rotational axis, and two wheel discs connected to the hub and spaced coaxially on the hub. A number of roller bodies are located between the wheel discs, evenly distributed around a circumferential edge of the wheel. The respective roller axes of the roller bodies are aligned at a diagonal angle relative to the rotational axis, and are each supported in a freely rotating manner between the wheel discs at opposite ends thereof. Each roller body is mounted in a freely rotating manner in respective modules respectively attached to the wheel discs.

5 Claims, 4 Drawing Sheets

OMNIDIRECTIONAL WHEEL AND METHOD FOR THE ASSEMBLY THEREOF

BACKGROUND OF THE INVENTION

1. Field of the Invention

The invention concerns an omnidirectional wheel and a method for installing roller bodies of an omnidirectional wheel, as well as an omnidirectional movable chassis embodying such an omnidirectional wheel.

2. Description of the Prior Art

The prototypical of an omnidirectional wheel is known from DE-OS 21 58 019. Such wheels can be used to move vehicles in any desired direction without having to be borne in a pivoting fashion on the vehicle. Two forward and two rear rotating drive arrangements can thereby be provided that respectively possesses an omnidirectional wheel. The drives are individually controllable and the rollers contacting the floor are arranged at an angle, wherein a first diagonal pair of wheels respectively runs at an angle in the same direction and a second diagonal pair of wheels runs inclined at a right angle to the first diagonal pair.

In WO 2007/016917 A2 an omnidirectional wheel is disclosed that has a wheel hub that can be rotated around a rotation axis, wherein two wheel discs connected with the wheel hub are arranged coaxial to the wheel hub, and a number of rounded roller bodies are provided that are arranged between the wheel discs, are distributed uniformly along a circumferential shell of the wheel and are aligned with their roller axes at a diagonal angle to the rotation axis of the wheel hub. On their opposite ends the roller bodies are borne such that they can rotate freely relative to the wheel discs. The roller bodies are borne (via associated bearings) directly on the insides of the wheel discs. This has the disadvantage that all bearing positions must be matched to one another in terms of production so that all roller bodies are positioned concentrically and symmetrical to one another without position deviations. As a result the installation of such wheels is complicated since the precise positions of the roller bodies must be adjusted repeatedly and laboriously during the installation. Moreover, even given proper use a high moment applied to the omnidirectional wheel can produce a torsion of the hub that causes a rotation movement of the one wheel disc relative to the second wheel disc, whereby all adjusted bearings of the roller body can experience a displacement. However, the use of opposing wheel discs between which the roller bodies are arranged has proven its worth.

On the periphery these wheels have rollers that are aligned at a 45° angle to the rotation axis. The surface of the rollers is curved so that the circumferential surface on which the wheel rolls describes a circle. The support structure of these wheels is formed by the two side walls. The rotation axes of the rollers are positioned by the bearing surfaces in the side walls. An axial offset of the two guides in which the rollers are borne results via a rotation of the two side walls relative to one another. This applies for all rollers. This leads to problems with the bearing of all rollers. The support points at both side walls for all rollers on the periphery of the wheel must be aligned towards one another in pairs, and the axes of the bearing points must align relative to one another. If this is not the case, an axial offset of the bearings of individual wheels results, which leads to problems with the bearing of these rollers, which should be avoided. Therefore in the prior art the side walls must be produced with narrow tolerances.

SUMMARY OF THE INVENTION

It is an object of the invention to achieve an omnidirectional wheel while retaining opposite wheel discs, which omnidirectional wheel is robust with regard to operating requirements.

An additional object of the invention is to achieve an omnidirectional wheel while retaining opposing wheel discs, which omnidirectional wheel can be produced and operated with high bearing precision of the roller bodies.

According to the invention an omnidirectional wheel has the following features:

- a wheel hub that can be rotated around a rotation axis,
- two wheel discs connected with the wheel hub that are arranged coaxial to the wheel hub,
- a number of rounded roller bodies that are arranged between the wheel discs, are distributed uniformly along a peripheral shell of the wheel, are aligned with their roller axes at a diagonal angle to the rotation axis of the wheel hub and are mounted and supported at their opposite ends such that they can rotate freely relative to the wheel discs, wherein the roller bodies are mounted such that they can rotate freely at receptacle modules, and the receptacle modules are attached to the wheel discs.

The receptacle modules produce an exact alignment of the opposing bearing points for the roller bodies, independent of the torsion forces which act on the hubs or the wheel discs. Every roller body can be preinstalled at its receptacle module. As a result this means that each bearing of the roller bodies can be precisely adjusted individually and independently of one another. This independent adjustment capability ensues relative to the receptacle module and therefore is independent of the wheel discs. Each receptacle module accepts the two opposing bearing points of an individual roller body. Each roller body is thus borne at a separate receptacle module. Every receptacle module is attached to both the one and the other wheel disc. Every receptacle module bears one roller body, such that a separate receptacle module is provided at the omnidirectional wheel for every roller body of an omnidirectional wheel. Every receptacle module is attached to both wheel discs. Every receptacle module thus forms a bridge-like support which establishes the axial separation of the two wheel discs. Torsion forces from one wheel disc to the other wheel disc are consequently transferred via the receptacle modules and not (or at most to only a small degree) via the roller bodies.

Each individual roller body is thus borne such that it can rotate freely at a separate respective receptacle module, and every receptacle module is attached to both wheel discs. The receptacle modules thus produce an exact alignment of the opposing bearing points for the roller body independent of the torsion forces which act on the hub or the wheel disc. A preinstalled roller body unit thereby results for each roller body. As a result this means that every bearing of the roller body can be precisely adjusted individually and independent of one another. This independent adjustment capability ensues with regard to the receptacle module and therefore is independent of the wheel discs. Multiple individual, preinstalled roller body units can then be attached in a simple manner to the wheel or, respectively, the wheel discs.

Ever single roller body can be borne such that it can rotate freely at a separate respective receptacle module. A separate receptacle module is thus associated with every roller body. This means that the bearings of each individual roller body are provided at a separate receptacle module. Every roller body can thus be borne at an individual receptacle module and be adjusted (with regard to alignment, offset, spacing and tolerances) in isolation relative to the receptacle module.

A preinstalled roller body unit thereby results for every roller body. Multiple roller body units can then be attached in a simple manner to the wheel or, respectively, the wheel discs.

The receptacle and bearing of the rollers on the circumference of the wheel in accordance with the invention enables the use of a small hub for the wheel. The wheel thereby possesses wide walls with which the distance between hub and rollers is bridged. The rollers are borne in mounts that are attached to one web per roller.

The following advantages result from this:
The bearings of the individual rollers are independent of one another and therefore can be adjusted separately.
Excessively high requirements for the production tolerances of the side walls (i.e. the wheel discs) do not exist due to the independence of the rollers relative to one another.
The support structure of the wheels is formed by side walls or wheel discs at the wheels. This enables an arbitrarily large hub to be used for the wheel.
Every roller is borne on a separate web that connects the two side walls or, respectively, wheel discs with one another.
The wheel construction is more rigid with less material use since a closed force flow is possible over the hub, the two side walls or, respectively, wheel discs and possible webs.

The solution according to the invention and the special solution variants described in the following thus strive for the goals:
The bearings of the rollers on the circumference of the wheel should be independent of one another.
The bearings of the rollers on the circumference of the wheel can be adjusted separately from one another.
The side discs or wheel discs of the wheel can be produced with lower tolerances than given the wheels according to the species from the prior art, according to which the positions of all bearings (and therefore the rollers) are determined by the side discs or wheel discs.
The wheel has a greater rigidity in relation to the total weight.
A torsion of the hub or other support structures of the wheel does not negatively affect the bearings of the rollers, The receptacle module can be designed extending in the shape of web from a first facing side to a second facing side of the roller body and be provided with flange segments situated opposite one another at the ends for its attachment between the wheel discs of the wheel. The receptacle module thereby forms a cross-support that also produces an additional reinforcement of the wheel in the region of the wheel disc edges. The web-shaped receptacle module forms a largely rigid connection of the two opposite bearing points for the associated roller body. The web-shaped receptacle module can be fashioned as a single piece. It can exhibit a rectangular cross section.

In an embodiment, the flange segments of the receptacle module can be attached at inner sides of the wheel discs that face one another. In another development, the receptacle modules could, for example, be attached in the region of the outer circumference of the wheel discs. This attachment on the outer circumference can in particular ensue positively and/or non-positively. For this the wheel discs do not necessarily need to possess a circular contour. Rather, the wheel discs can have a contour deviating from the circular shape, for example in polygonal form or in a manner of a star-shaped contour. The position of the receptacle modules (and therefore the position of the roller bodies) is defined by the peripheral contour.

The flange segments can thereby possess projections to positively engage in grooves of the wheel discs. The projections of the flange segments of the receptacle modules thereby positively engage in the grooves of the wheel discs. The grooves can exhibit any shape that is suitable to form a niche-like recess in which corresponding projections of the receptacle modules can positively engage. The projections and grooves serve for at least a positive pre-attachment of the receptacle modules to the wheel without having to be the sole attachment means. For example, a pre-attachment can be achieved merely by inserting the receptacle modules into the grooves of the wheel discs, wherein a load-bearing attachment ensues via the clamping force on the facing sides of receptacle modules and wheel discs, for example via releasable bolt connections. Other attachment means can also be provided instead of a bolt connection. These could be designed so as to be releasable or permanent.

In one embodiment of the receptacle modules, the opposing facing sides of every single roller body can respectively be associated with an angle support, wherein a pivot bearing is respectively fashioned between roller body and angle support and the angle support is attached to the receptacle module. The receptacle module must be able to enclose the roller body in a C-shape so that every roller body can be borne from its opposing facing sides so that it can rotate on the receptacle module. The receptacle module can inasmuch be manufactured in one piece, for example be cast or be cut from a solid. However, in terms of manufacturing it can also be reasonable to design the receptacle module in multiple parts. For example, in this case the receptacle modules can consist of a flat, planar base support on which are attached two opposing angle supports in order to achieve the C-shaped design of the receptacle module. This has the advantage that the bearing points to accommodate pivot bearing elements (for example ball or roller bearings) can be produced in a simple manner (in terms of manufacturing) in the angle supports before they are attached to the base supports. For example, the angle supports can be connected (for example via bolts) with the base support. Due to the detachment capability of the bolt connections, individual bearings or, respectively, angle supports can also be exchanged (for example due to wear).

The invention also concerns a method to install roller bodies of an omnidirectional wheel with the following steps:
flush placement of a first angle support on a bearing surface of a receptacle module,
attachment of the first angle support to the receptacle module,
use of a first facing-side end of the roller body in a first bearing position of the first angle support,
placement of a second bearing position of a second angle support at a second facing-side end of the roller body and placement of the second angle support at the receptacle module,
adjustment of the second angle support until the first bearing position and the second bearing position align with the roll axis of the roller body,
attachment of the second angle support on the receptacle module in the adjusted position.

In an embodiment of the method according to the invention,
attachment of the receptacle modules bearing the roller body between two wheel discs of the omnidirectional wheel
can be provided as a further step.

This attachment can ensue by:
use of projections of the flange segments of the receptacle modules in opposite grooves in the wheel discs of the omnidirectional wheel,
bolting the receptacle modules down on the wheel discs.

The invention also concerns an omnidirectionally movable carriage with omnidirectional wheels with the features described above according to the invention.

Such an omnidirectionally movable carriage is suitable for use to move an autonomous manipulator forward.

DESCRIPTION OF THE PREFERRED EMBODIMENTS

Figure 1:
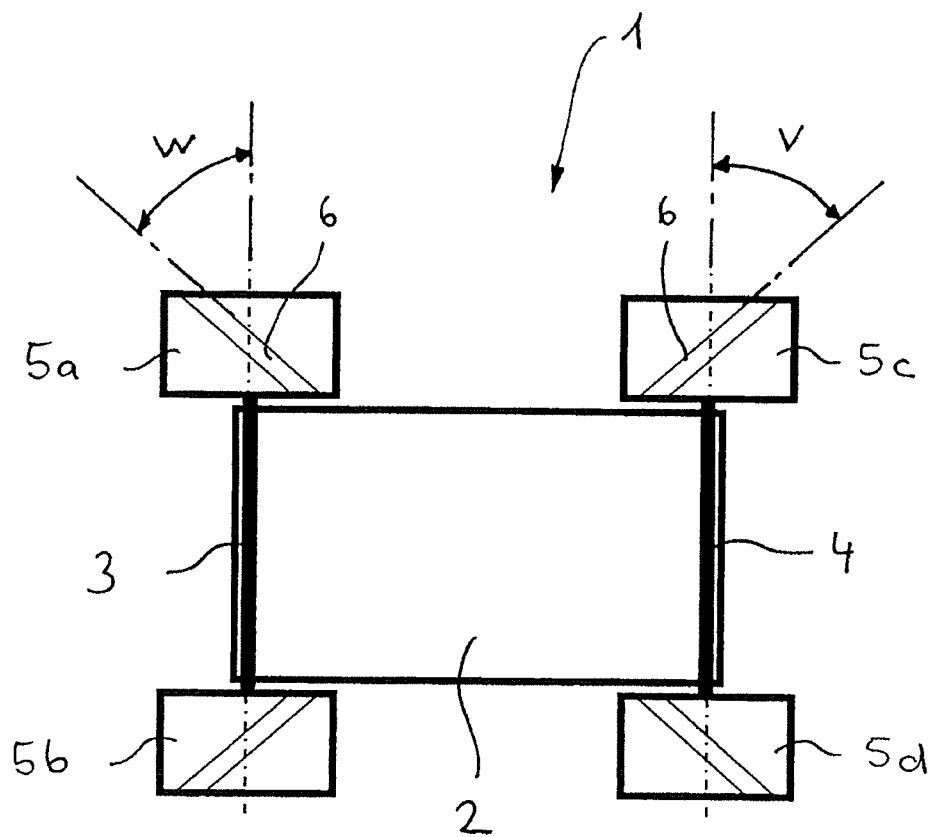
FIG. 1 schematically illustrates an omnidirectional moveable vehicle.

FIG. 1 shows an omnidirectionally movable carriage 1 with a chassis 2 as well as a first geometric wheel axis 3 and a second geometric wheel axis 4. Aligned along the first wheel axis 3, the chassis 2 bears a right front omnidirectional wheel 5a and a left front omnidirectional wheel 5b. Aligned along the second wheel axis 4, the chassis 2 bears a right rear omnidirectional wheel 5c and a left rear omnidirectional wheel 5d. Each omnidirectional wheel 5a, 5b, 5c, 5d is connected with its own drive. Every drive can be controlled independent of the other drives, both with regard to rotation speed and with regard to rotation direction. Each diagonal wheel pair 5a, 5c and 5b, 5d has roller bodies 6 that are aligned running in the same direction at an angle W inclined relative to the wheel axis 3 or wheel axis 4. The respective other diagonal wheel pair 5a, 5c and 5b, 5d has roller bodies 6 that are aligned running in the same direction at an angle V opposite the angle W, inclined relative to the wheel axis 3 or, respectively, wheel axis 4. The roller bodies 6 are typically arranged at an angle W and V of 45°. However, in special embodiments other angles W and V can be realized, for example between 30° and 60°. If all four wheels 5a, 5b, 5c and 5d move with the same speed in the same rotation direction, the carriage 1 moves straight ahead forwards. If the wheel pairs 5a, 5b, or 5c, 5d of the same respective wheel axis 3 or 4 rotate in opposite directions and all wheel pairs 5a, 5b, 5c and 5d rotate with the same rotation speed, the carriage 1 moves sideways, thus perpendicular to the original direction of travel. If the diagonal wheel pairs 5a, 5d or 5b, 5c respectively rotate with the same rotation speed and all wheels 5a, 5b, 5c and 5d rotate with the same rotation direction, the carriage 1 moves diagonally or, respectively, aslant, i.e. at an angle that lies between the forwards direction and sideways direction. If the one wheel pair 5a, 5c of the right side rotates in one rotation direction and the other wheel pair 5b, 5d of the left side rotates in the opposite direction, the carriage 1 rotates around its center.

Figure 2:
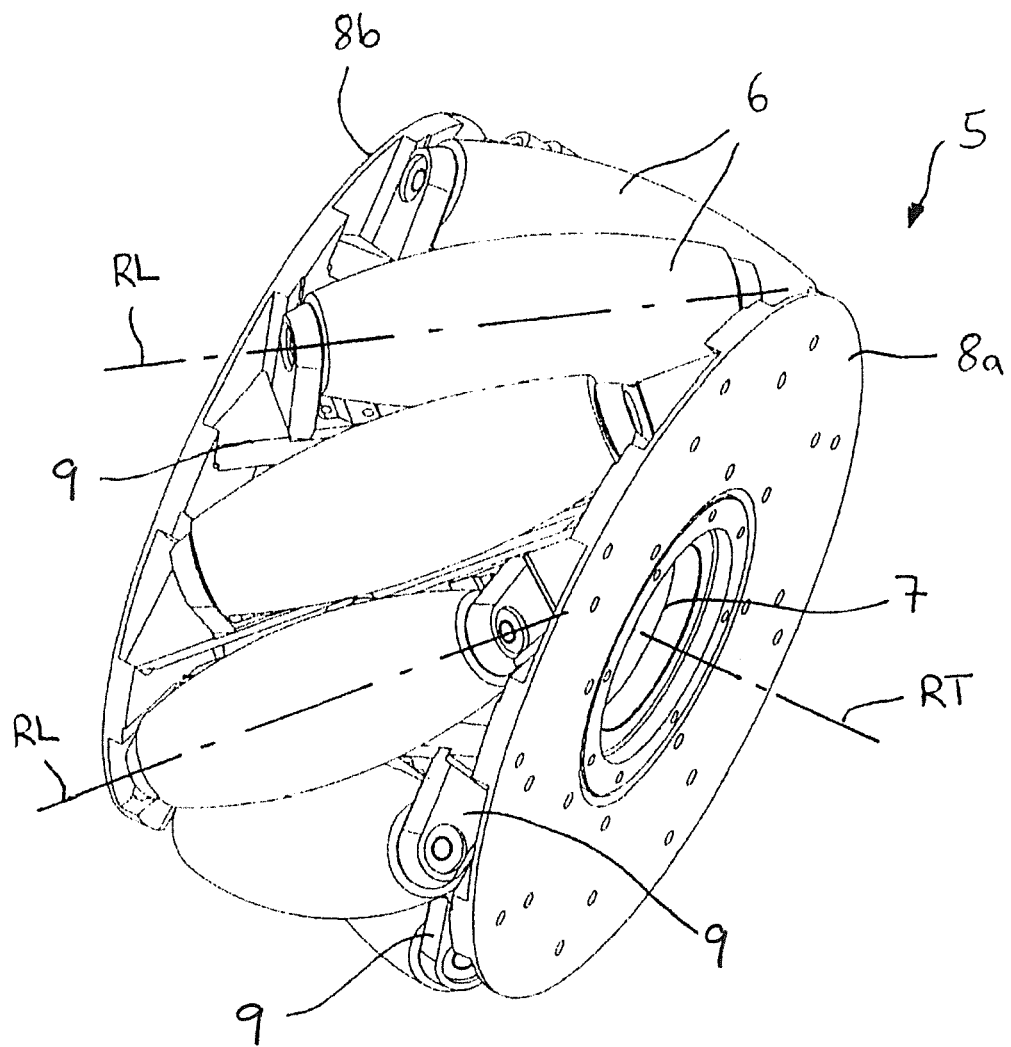
FIG. 2 is a perspective view of an omnidirectional wheel according to the present invention.

An exemplary embodiment of an omnidirectional wheel 5 is shown in FIG. 2. The omnidirectional wheel 5 has a wheel hub 7. The wheel hub 7 is rotatable around a rotation axis RT. Two wheel discs 8a and 8b are flange-mounted at opposite ends of the wheel hub 7. The wheel discs 8a and 8b have a design in the shape of a circular disc and are arranged coaxial with the wheel hub 7. A torque introduced via the wheel hub 7 is relayed to the roller bodies 6 via the wheel discs 8a and 8b. The omnidirectional wheel 5 has multiple roller bodies that are arranged distributed at a uniform distance from one another along a shell region of the omnidirectional wheel 5. Depending on the wheel diameter and the roller body diameter, different numbers of roller bodies can be provided per omnidirectional wheel 5. All roller bodies 6 orient with their roller axes RL at a diagonal angle, thus aslant to the rotation axis RT in the same manner and at the same angle W. The roller bodies 6 are typically arranged at an angle W of 45°. However, in special embodiments other angles W can also be realized, for example between 30° and 60°. Every roller body 6 is borne such that it can rotate on its own receptacle module 9.

Figure 3:
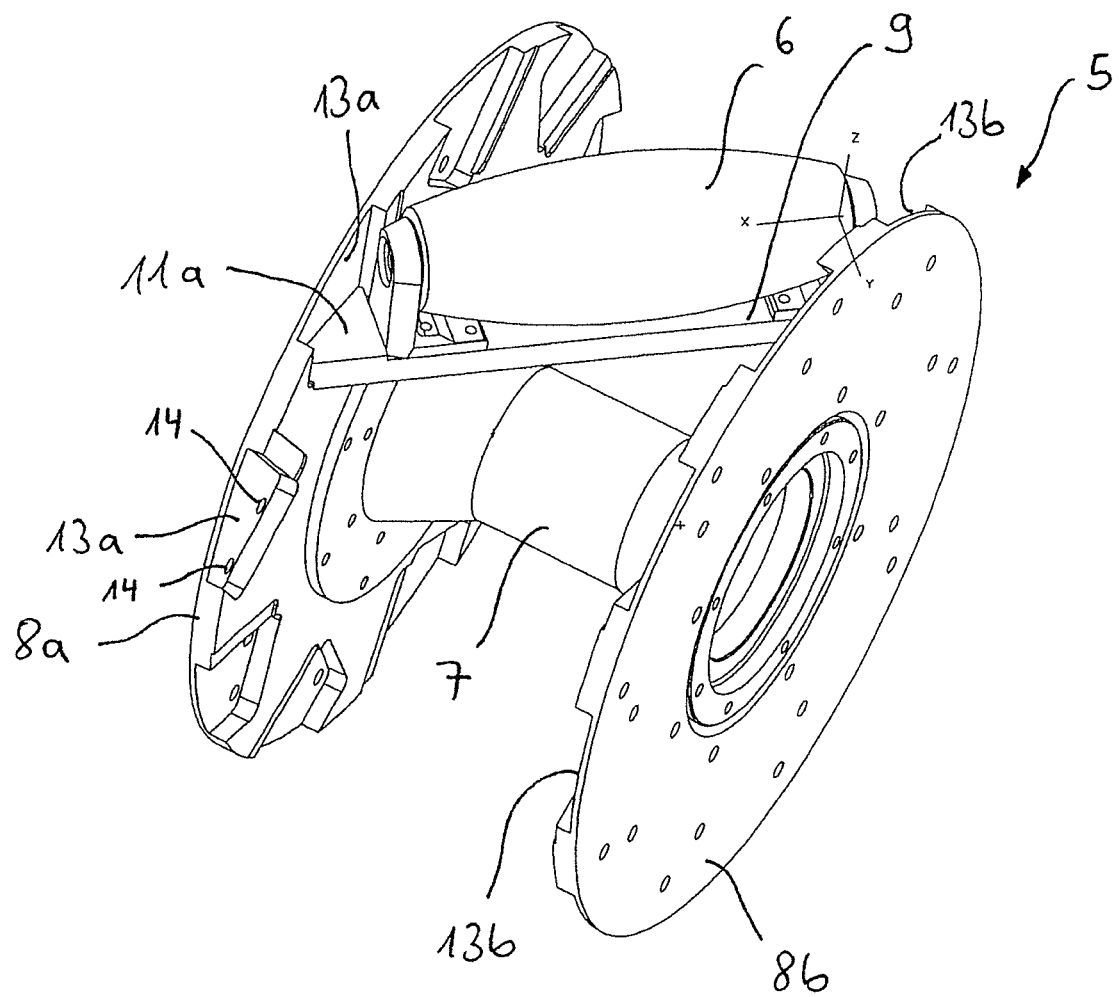
FIG. 3 is a perspective view of the omnidirectional wheel of FIG. 2, with a single roller body according to the invention and a receptacle module in its installed position on the wheel discs.
Figure 4:
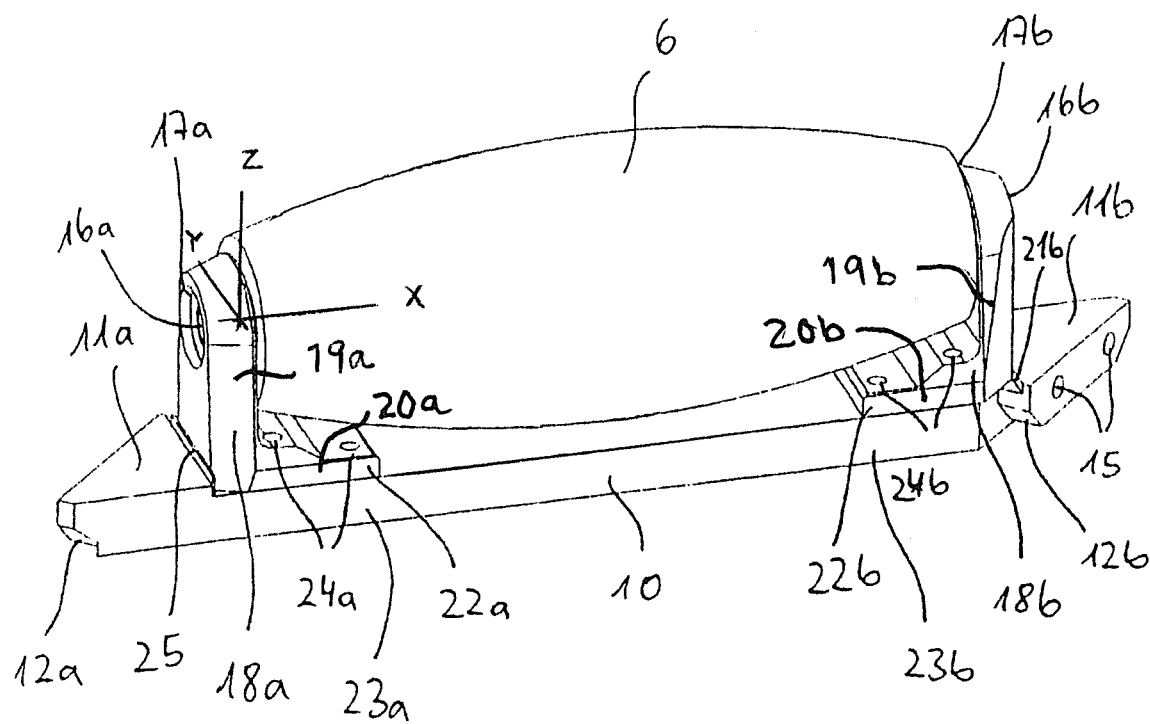
FIG. 4 is a perspective view of the individual roller body with the receptacle module of FIG. 3.

The receptacle module 9 is explained in detail in FIGS. 3 and 4. The omnidirectional wheel 5 from FIG. 2 is shown in FIG. 3 to facilitate the graphic representation with a single roller body 6 according to the invention and the receptacle module 9 in its installation position on the wheel discs 8a and 8b. The receptacle module 9 has a flat, planar base support 10. The base support 10 possesses a rectangular cross section. Flange segments 11a, 11b are located on the opposite, narrow facing sides of the base support 10. The flange segments 11a, 11b serve for the attachment of the base support 10 on the inner sides of the wheel discs 8a and 8b. For this attachment the flange segments 11a, 11b possess projections 12a and 12b (FIG. 4). In the installation positions for the receptacle module 9, the projections 12a and 12b engage in corresponding grooves 13a and 13b on the inner sides of the wheel discs 8a and 8b. The grooves 13a and 13b are fashioned open at the edges on the periphery of the wheel discs 8a and 8b, such that the base support 10 can be inserted in the radial direction between the wheel discs 8a and 8b preinstalled on the wheel hub 7. The final fixing of the base support 10 on the wheel discs 8a and 8b ensues by means of bolts (not shown) through the bores 14 in the wheel discs 8a and 8b.

As is shown in FIG. 4, threads 15 are introduced into the facing sides of the projections 12a and 12b, into which threads 15 the bolts are to be screwed in via the bores 14. The roller body 16 has axial pins 16a and 16b on opposite facing sides, which axial pins 16a and 16b are directed into bearing positions 17a and 17b. The bearing positions 17a and 17b are fastened in associated angle supports 18a and 18b. For this the angle support 18a possesses an angle support leg 19a (shown vertical in FIG. 4) for the bearing position 17a and an angle support leg 20a (shown horizontal) via which the angle support 18a is attached to the base support 10. In the same manner the angle support 18b possesses an angle support leg 19b (shown vertical in FIG. 4) for the bearing position 17b and an angle support leg 20b (shown horizontal) via which the angle support 18b is attached to the base support 10. The roller body 6 is borne with defined position between the angle support legs 19a and 19b (shown vertical in FIG. 4) such that it has can rotate. Upon installation, the angle support 18b is initially shifted against a bearing surface 21b of the base support 10, and the leading lateral surface 22b of the angle support 18b is aligned flush with the leading lateral surface 23b of the base support 10. The angle support 18b is subsequently bolted to the base support 10 via the bores 24b. The roller body 6 is now inserted into the bearing position 17b and the angle support 18a is placed on the axial pins 16a of the roller body 6. Via a fitting plate 25, the angle support 18b is brought into an aligned position in which the bearing of the roller body 6 is adjusted with regard to alignment, offset, separation and tolerances. In addition to this, the leading lateral surface 22a of the angle support 18b is aligned flush with the leading lateral surface 23a of the base support 10. The angle support 18a is subsequently bolted to the base support 10 via the bores 24a. After attaching the angle support 18a, the fitting plate 25 can be removed from the base support 10.

Each roller body 6 can as such be preinstalled at its receptacle module 9. This means as a result that each bearing position 17a, 17b of the roller body 6 can be precisely adjusted in isolation and independently of one another. This independent adjustment capability ensues with regard to the receptacle module 9 and is therefore independent of the wheel discs 8a and 8b.

Although modifications and changes may be suggested by those skilled in the art, it is the intention of the inventor to embody within the patent warranted heron all changes and modifications as reasonably and properly come within the scope of his contribution to the art.

The invention claimed is:

1. An omnidirectional wheel comprising:
   a wheel hub mounted for rotation around a rotation axis;
   two wheel discs connected to said wheel hub and mounted coaxially and co-rotationally with respect to said wheel hub with an axial spacing therebetween;
   a plurality of receptacle modules mounted to and between said wheel disks;
   each of said receptacle modules having a rounded roller body, having a roller axis, each roller body being mounted for free rotation around the roller axis thereof in the respective receptacle module, each roller axis being oriented at a diagonal angle with respect to said rotation axis of said wheel hub and each roller body being held between said wheel discs solely by the respective receptacle module in which the respective roller body is mounted, making rotation of the respective roller body in the respective receptacle module independent of changes in said axial spacing between said wheel discs; and
   each receptacle module comprising a web extending from a first facing side of the roller body to a second facing side of the roller body, said web having opposing flanges attached thereto at opposite ends at which the respective receptacle module is attached to an adjacent one of said wheel discs.

2. An omnidirectional wheel as claimed in claim 1 wherein said receptacle modules are attached at an outer peripheral region of said wheel discs.

3. An omnidirectional wheel as claimed in claim 1 wherein said flange segments of each receptacle module are attached at respective inner sides of said wheel discs that face each other.

4. An omnidirectional wheel as claimed in claim 3 wherein each flange comprises projections that positively engage in grooves of the respective wheel discs.

5. An omnidirectional wheel as claimed in claim 1 wherein each roller body has opposing facing sides, and wherein said omnidirectional wheel comprises an angle support respectively associated with said opposite facing sides of each roller body, and a pivot bearing located between each roller body and adjacent angle supports, said angle supports being attached to the respective receptacle module that supports the individual roller body.

* * * * *